May 27, 1941.  J. C. STEINER ET AL  2,243,133
POWER MOWING DEVICE
Filed March 19, 1938  5 Sheets-Sheet 1
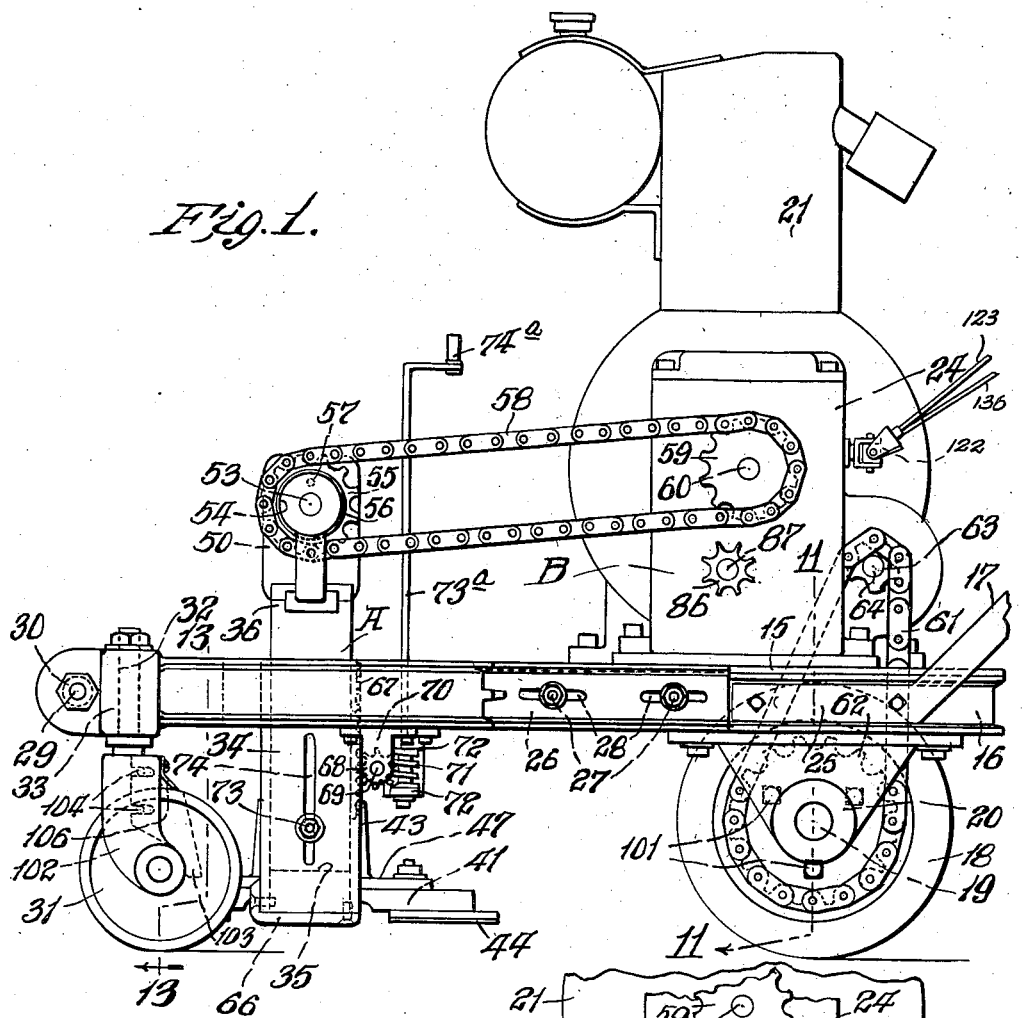

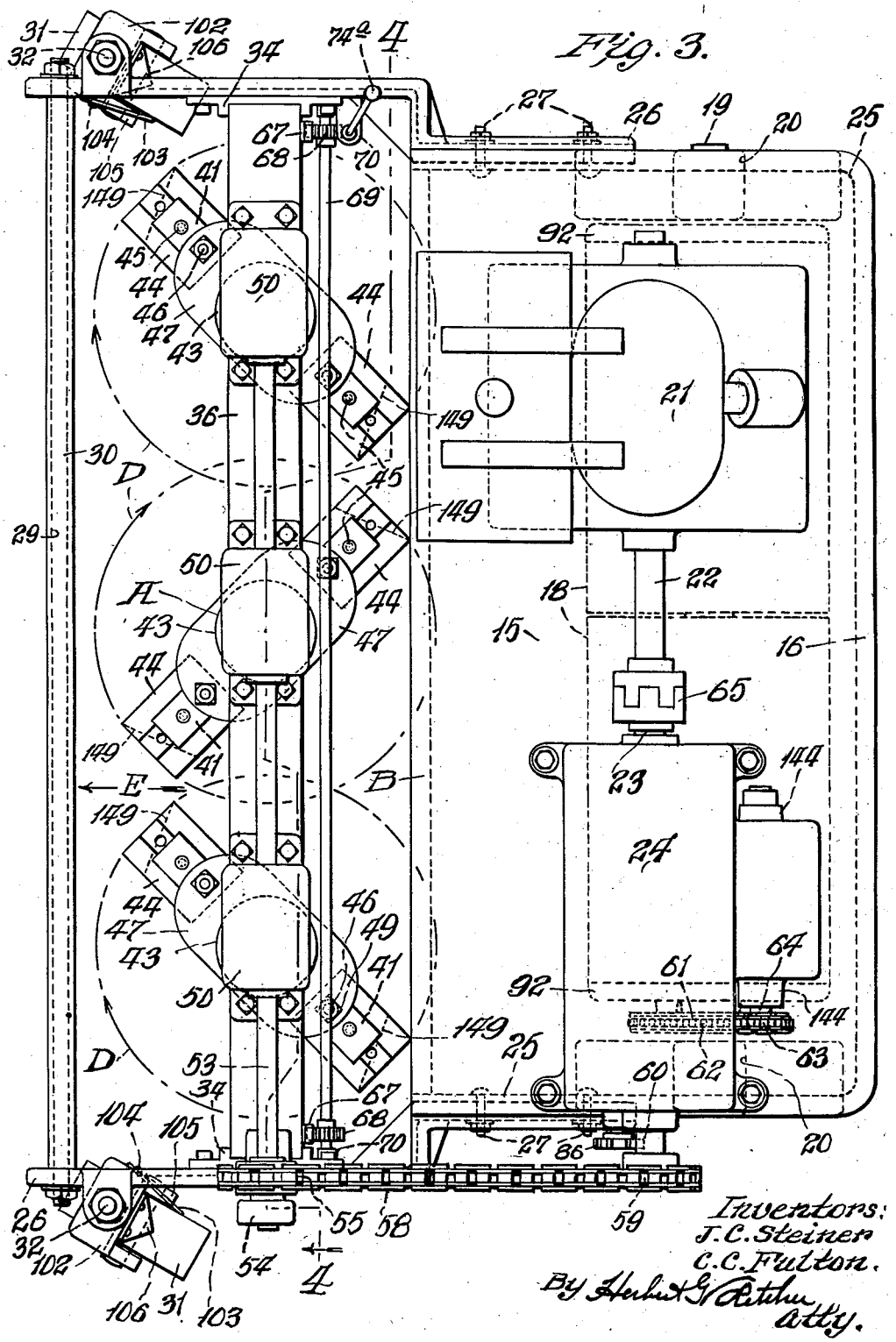

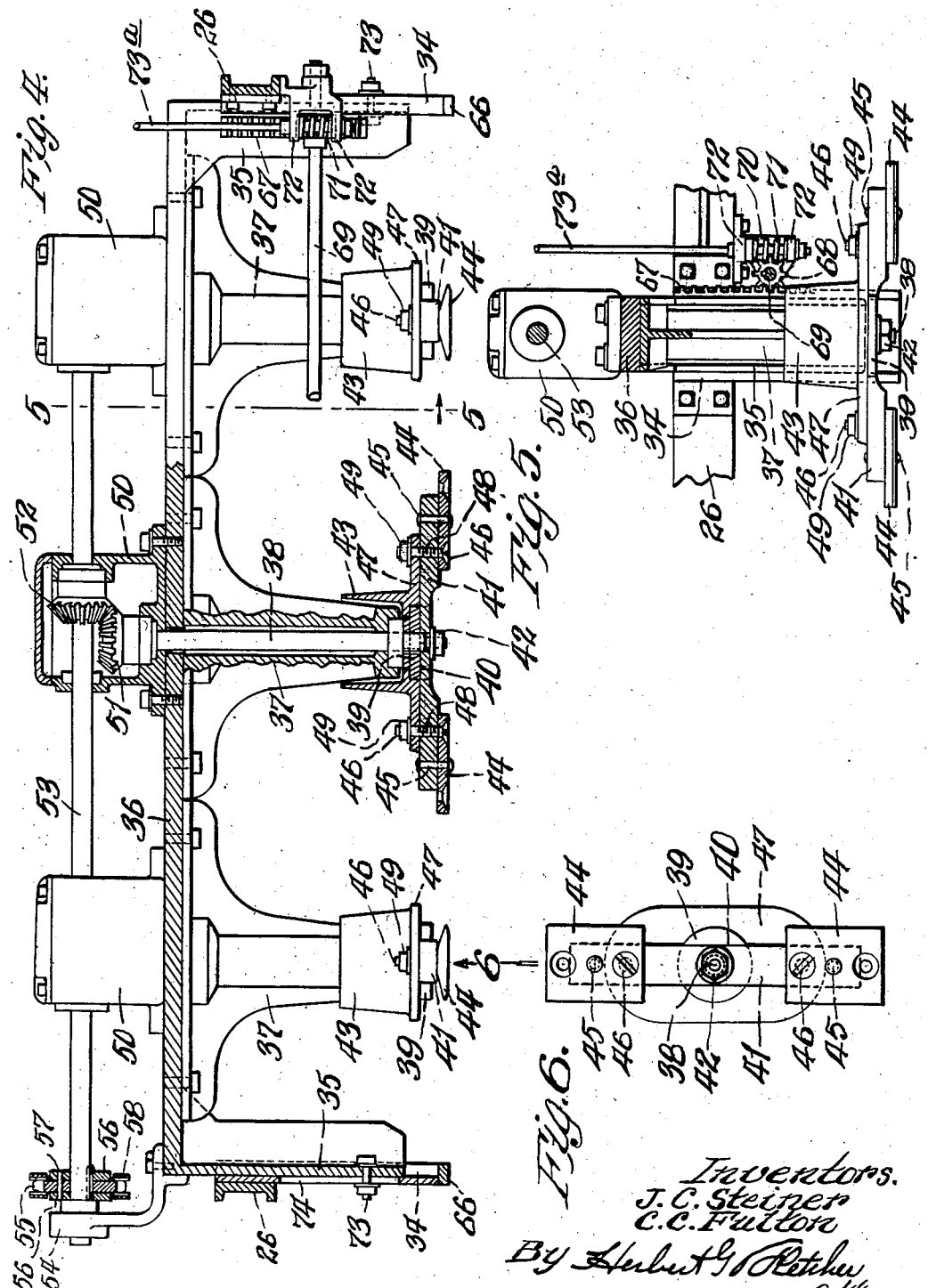

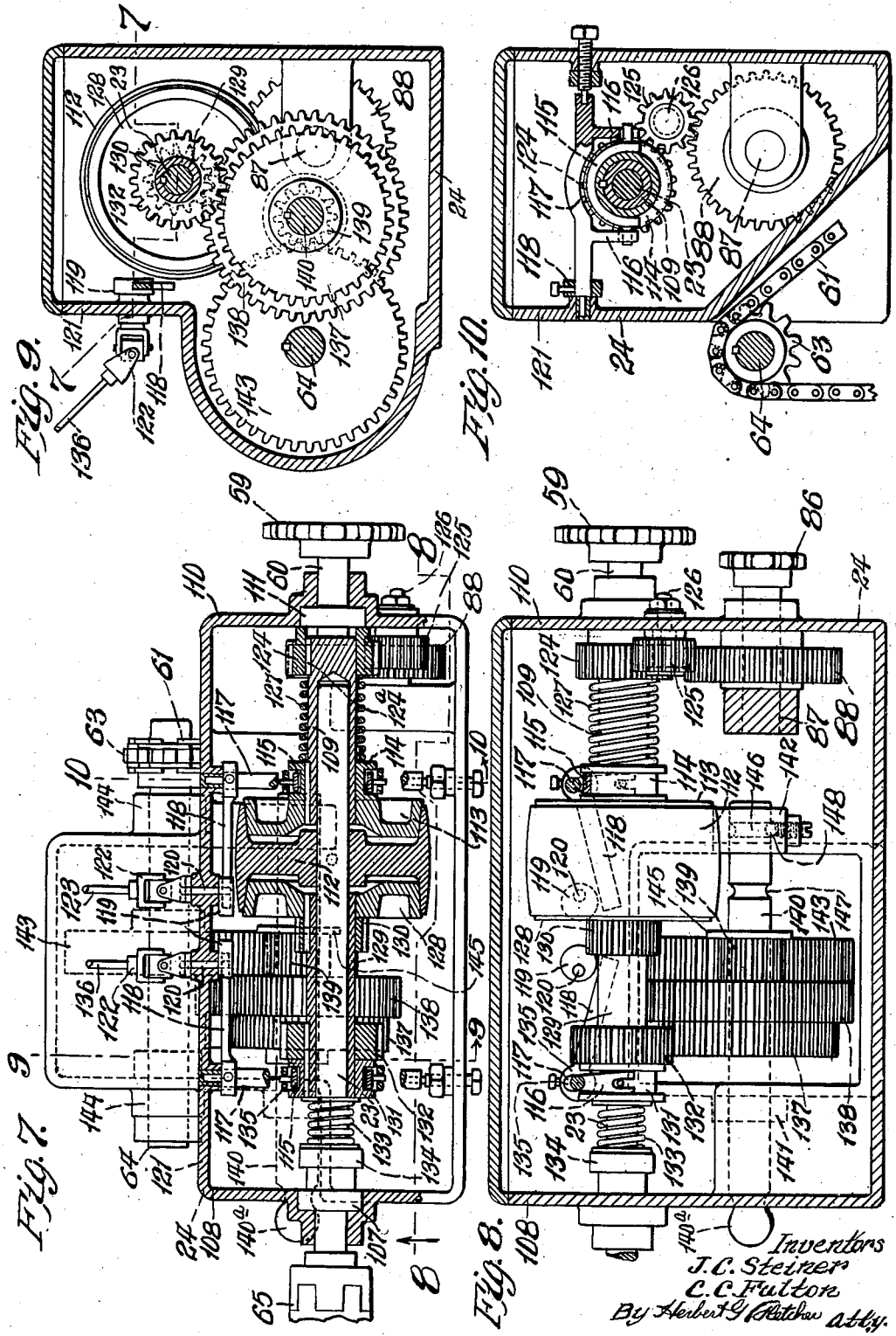

May 27, 1941.    J. C. STEINER ET AL    2,243,133
POWER MOWING DEVICE
Filed March 19, 1938    5 Sheets-Sheet 5
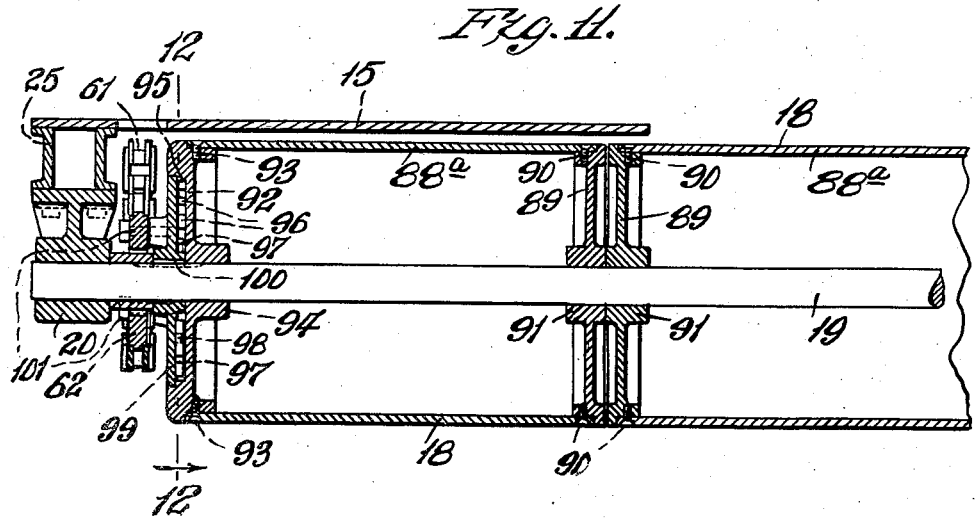
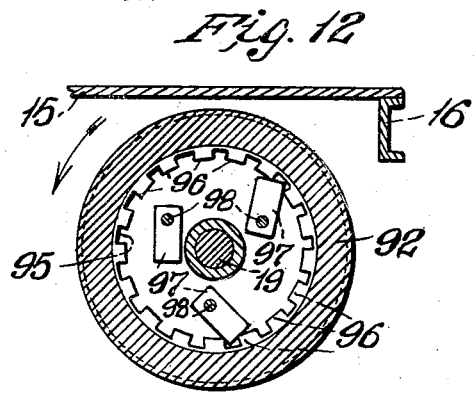
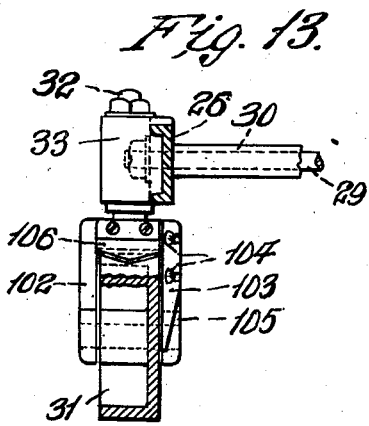
Inventors:
J. C. Steiner
C. C. Fulton.
By Herbert G. Fletcher
atty.

Patented May 27, 1941

2,243,133

UNITED STATES PATENT OFFICE 2,243,133

POWER MOWING DEVICE

Joseph C. Steiner and Claude C. Fulton, St. Louis, Mo.; said Fulton assignor to said Steiner Application March 19, 1938, Serial No. 196,875

6 Claims. (Cl. 56—25.4)

This invention relates to power mowing devices and has for one of its objects, the provision of improved means for combining the tractor or propelling device with either one of a pair of mowing devices, such as a mower or a weed cutter, as desired.

Another object is to provide improved detachable securing means for connecting the tractor to either the mower or the weed cutter.

A further object is to provide an improved propelling device with power driving means for cooperative attachment with the mowing devices.

A still further object of the invention is to provide the propelling device for the mowers with an improved cooperable power transmission device.

Another further object of the invention is to provide an improved driving mechanism for the traction rollers of the propelling device.

Another still further object is in providing the cutters of one of the mowing devices with improved adjustable means.

Other objects and advantages will appear as this description progresses and by reference to the drawings, in which:

Figure 1 is a side elevation of the propelling device or tractor in coupled relation with a mowing device.

Figure 2 is a side elevation of another mowing device coupled with the propelling device and the propelling device having portions thereof broken away.

Figure 3 is a horizontal plan elevation of Fig. 1.

Figure 4 is a transverse sectional view taken approximately on the line 4—4 of Fig. 3.

Figure 5 is a vertical transverse sectional elevation taken approximately on the line 5—5 of Fig. 4.

Figure 6 is an inverted view of one of the mowing or cutting devices taken in the direction of the arrow 6 in Fig. 4.

Figure 7 is an enlarged horizontal sectional elevation through the power transmission gearing, taken approximately on the line 7—7 of Fig. 9.

Figure 8 is an enlarged longitudinal vertical sectional elevation taken approximately on the line 8—8 of Fig. 7.

Figure 9 is an enlarged transverse vertical sectional elevation taken approximately on the line 9—9 of Fig. 7.

Figure 10 is an enlarged transverse vertical sectional elevation taken approximately on the line 10—10 of Fig. 7.

Figure 11 is a longitudinal vertical sectional elevation taken through the traction roller approximately on the line 11—11 of Fig. 1.

Figure 12 is a transverse vertical sectional elevation taken approximately on the line 12—12 of Fig. 11.

Figure 13 is a transverse vertical sectional elevation taken approximately on the line 13—13 of Fig. 1.

Referring by numerals to the accompanying drawings, and particularly Figs. 1 and 3, 15 designates a horizontally disposed base plate which is supported on a channel member frame 16 to which guiding handle bars 17 are connected at their lower ends, and for the support of said base plate are a pair of alining traction rollers 18 which are loosely turnable on a shaft 19 which is supported in end bearings 20.

Secured on the base plate 15 is an internal combustion motor 21 having a horizontally disposed driving shaft 22 which connects with an in-line transmission shaft 23 of power transmission gearing, which is disposed in the transmission gearing box 24.

Adjustably secured to the side disposed channel members 25 of the base plate 15 are respective horizontally disposed and forwardly extending arms 26, said arms being secured to the side channel members 25 by bolts 27 which are carried by said channel members and extend through respective longitudinal slots 28 of respective arms 26.

The arms 26 at their forwardly extending ends are secured in tied relation by an end bolted rod 29 with a spacer sleeve 30 thereon in end abutment with respective arms, and for the support of said arms at their extending ends, are respective casters 31, the turning pin 32 of each castor being vertically supported in a bearing 33 on respective arms.

Mounted on the inside of each arm 26 rearwardly of respective castors 31 is a vertically disposed guiding member 34, said guiding members being in transverse alinement and are for the vertically adjustable support of respective depending ends 35 of a horizontally disposed supporting beam 36 which is disposed transverse to the arms 26, as shown more clearly in Figs. 3, 4 and 5. Depended from the supporting beam 36 are a series of vertically disposed pedestals 37 and supported in each pedestal is a vertical shaft 38 and secured to the lower end of each shaft outwardly of respective pedestals, is a hub 39 having a diametrically disposed recess 40 on its under face for the reception of a cutter bar 41. Each cutter bar 41 is secured in a recess of respective hubs 39 by a nut 42 which is engaged on the lower ends of respective shafts 38, and secured on the upper side of each cutter bar is an upwardly extending hub 43, said hubs overengaging the lower ends of respective pedestals 37 for preventing roughage such as weeds, entangling between each shaft 38 and respective pedestals.

Carried by the extending ends of each cutter bar is a double-edged knife 44, each knife having a set of three alining holes, the intermediate hole of each set being of smaller diameter and is for the reception of a securing rivet 45 which may be made of a relatively soft material for shearing purposes, and the rivet 45 of each knife 44 being secured in respective cutter bars 41.

A bolt 46 is mounted in each inner disposed hole of respective knives 44 and is passed through a respective alining hole in the flange 47 of respective hubs 39 and is secured therein by each bolt being threadingly engaged at 48 in respective cutter bars 41, and the bolts 46 are then secured in locked position by the nuts 49.

The upper end of each shaft 38 extends through the supporting beam 36 and into respective gear boxes 50 which are secured on the upper side of the supporting beam 36, and fixed to the upper end of each shaft 38 is a bevel gear 51 meshing with a similar gear 52, said gears 52 being fixed to a horizontal shaft 53 which extends through all of the gear boxes 50 and has bearing support in said gear boxes.

The shaft 53 adjacent one end, is supported in a bearing 54 which is mounted on one end of the supporting beam 36 and on said extending end of said shaft 53, is a sprocket 55 which is mounted between a pair of discs 56 which are keyed to said shaft, and the sprocket 55 being secured to the discs by a shear pin 57. Mounted over the sprocket 55 is one end of an endless chain belt 58, the other end of said belt being engaged on a sprocket 59 which is fixed to one end of a shaft 60 which extends from the transmission gearing of the transmission gearing box 24, said shaft being in alinement and clutch-coupled with the transmission shaft 23.

The manner in which the knives 44 are mounted on respective cutter bars 41, when the shafts 38 are revolved, provide horizontally rotatable cutters which are ideal for being projected into weeds and other roughage growth, as the mowing device is propelled forwardly by the traction rollers 18. In this connection, forward rotary motion to the traction rollers 18 is derived by an endless chain belt 61 over-engaging the sprocket 62 which is keyed to the traction roller shaft 19, and said chain belt 61 cooperably engaging a sprocket 63 which is securely fixed to a shaft 64 which is extended from the transmission gearing box 24 and is rotated by cooperable gearing within the gearing box 24.

As the traction rollers 18 when in operation, propel the mowing device, it is obvious that the power transmission gearing within the gear box 24 is in operation by power source from the motor 21 through the shaft 22 of said motor, being coupled at 65 to the transmission shaft 23 (Figs. 3 and 7), and as the shaft 60 is in alinement with and coupled with the shaft 23 by clutching means hereinafter described, said shaft 60 on which the sprocket 59 is secured, will be operated at high or motor shaft speed, and the chain belt 58 which is mounted over the sprockets 59 and 55 which are of like diameters, will transmit the motor shaft speed to the drive shaft 53 which operates the cutter bar shaft 38 through the relatable gearing shown and described.

During rotary operation of the knives 44, in the event a knife strikes an obstacle such as a stone, with sufficient force, yield by the striking knife will be afforded by the shear rivet or pin 45 being transversely severed so that the striking knife can swing away from the object on the bolt 46. After the rivet 45 of an object striking knife has been sheared, the respective knife however, will be enabled to continue its cutting action as the same will tend to be swung outwardly on its bolt 46 by centrifugal motion of the rotating cutter bar 41.

In the event the cutter bars 41 are disposed in close proximity to the turf, wherein the knives 44 thereof would ordinarily scalp the turf due to gullies or unevenness of the ground, a ground engaging runner 66 is secured to the lower end of each guiding member 34, said runners upon engaging and contacting the turf, preventing ground contact of the knives therewith.

Under circumstances due to a heavy growth or roughage to be cut, it may be found necessary to elevate or lower the cutter bars 41 and their knives 44 to a greater or lesser distance above the ground surface, and for adjusting the elevation of the cutter bars in unison, the supporting beam 36 is capable of being raised or lowered on account of the depending ends 35 of said beam being slidably mounted in respective guiding members 34. To this end, each depending end 35 of the supporting beam 36 is provided with a vertically disposed rack 67, and in mesh with each rack is a pinion 68, each pinion being keyed to respective ends of a shaft 69 which is horizontally supported in bearings 70.

In mesh with one of the pinions 68 is a worm gear 71 which is supported in bearings 72 which are extended from one of the bearings 70 of the shaft 69, and fixed to said worm gear is a vertically extending rod 73ª having a crank end 74ª for turning operation of said rod to effect turning action of the worm gear 71 on the respective pinion 68 for causing the gears to cooperate with respective racks 67 for elevating or lowering the supporting beam 36 of the cutter bars 41. To assist the worm gear 71 and the respective pinion 68 to lock the supporting beam 36 in a desired elevated position, a locking bolt 73 is carried by each depending end 35 of the supporting beam 36, each bolt projecting through a vertical slot 74 which is formed in respective guiding members 34. Obviously, during adjusting of the supporting beam 36, the locking bolts 73 are loosened and after the adjustment has been made, said locking bolts are made secure to clamp the respective depending ends 35 of the beam 36 in respective guiding members 34.

After cutting use of the horizontally rotatable cutter bars 41 and their knives 44 on weedy growth or roughage by the device or unit further designated as A, said device may be detached from the power device B by disconnecting the bolts 27 from the pair of arms 26, and another device C (Fig. 2) may be secured to the power device B by engaging and fastening the arms 75 of the device C to the side disposed channels 25 of the base plate 15 by the securing bolts 27, which are carried by the side disposed channel members 25.

The device C shown, is of a reel or cylinder type mower having the cutting reel 76 keyed to a horizontally disposed shaft 77 which is supported at its ends in respective side frames 78, and said frames being supported from the ground by a rearwardly disposed roller 79 and forwardly disposed casters 80.

The side frames 78 of which but one is shown, are each provided with a horizontally extending annular flange 81 and each of the arms 75 is provided with a horizontally extending hub 82, each hub 82 being mounted over a respective flange 81 and is held on said hubs by respective screw-held washers or discs 83. This hub and flange engaging structure provides for a flexible connection of the arms 75 with the device C.

Securely fixed on one end of the shaft 77 is a sprocket 84, and mounted over said sprocket is an endless chain belt 85 which is cooperably mounted on a sprocket 86, which is secured on a shaft 87, said shaft being extended from the transmission gearing box 24, and mounted on said shaft within the gearing box is a reduction gear 88 having cooperable relation with the transmission gearing of said gearing box.

With further regard to the traction rollers 18, a detailed construction thereof in Figs. 11 and 12, shows each roller comprising a sheet metal cylinder 88ª having a member 89 secured at one end by screws 90, and the hub 91 of each member 89 being loosely mounted on the shaft 19, the opposite end of each roller having a member 92 secured thereto by screws 93, and the hubs 94 of the end members 92 being loosely mounted on the shaft 19.

Each member 92 (only one of which is shown in detail) is counter-bored on one of its faces to provide an inner periphery 95 from which inwardly disposed teeth 96 are projected, said teeth being for cooperation with a plurality of gravity actuating dogs 97 which are mounted on respective pins 98 that are projected from a disc 99, said disc being fixed to the shaft 19 by the key 100, and secured to the disc 99 by the screws 101, is the sprocket 62 with which the endless chain belt 61 is cooperable.

The member 92 (not shown) which is secured to the outer end of the other roller 18, is cooperable with another dog carrying disc 99 keyed to the shaft 19 but is without the sprocket 62, as the shaft 19 is driven from but one end. As the sprocket 62 and the disc 99 to which it is secured, is driven in the direction of the arrow shown in Fig. 12, at least one of the dogs 97 of said disc 99 will engage a respective tooth 96 of the member 92, thereby turning said member and a respective roller 18. Likewise, a dog 97 of the disc 99 which is keyed to the other end of the shaft 19, will engage a tooth 96 of the other member 92.

The dogs 97 are of a size to give them sufficient weight to gravitate on respective pins 98 so that they will be free to readily engage and disengage respective teeth 96, in the event of receding action of respective rollers when the device B and its unit or attachment is swerved from its straight traveling path by a swaying motion given to the guiding handle bars 17 by the operator. Also, relatively heavy dogs will be capable of freeing themselves from dust or dirt accumulations which may gather in and around the dogs.

With further regard to the device or unit A having the horizontally rotatable knives 44 in the event an obstruction such as a jutting rock or the like, is encountered by a rotating knife and the knife cannot be forced to glance or slide thereover, the shear pin 57 which secures the sprocket 55 between the pair of discs 56, will be cut or broken, thereby eliminating further straining turning effort on the shaft 53 to continue rotation of the knives 44 and the bars 41 to which they are mounted. The shearing of the pin 57 will consequently prevent resulting damage from buckling forces and the like, to the device A and its power device B, which would likely occur if the rotating knives were held from rotation without the intervention of the feature of the shear pin 57.

The double-edged knives 44 each having a set of three aligning holes, are consequently capable of reversible mounting to the cutter bars 41 so that both cutting edges of each knife can be utilized.

To prevent cut weeds and the like, wedging between the inner side face of each of the casters 31 and their respective supporting yokes 102, an inclined plate 103 is adjustably secured by the screws 104 to one of the legs 105 of each yoke, as shown in Figs. 1, 3 and 13, and for removing accumulated earth from the periphery of each caster 31, a scraping plate 106 is secured to respective yokes 102, as shown in Figs. 1 and 3.

The power transmission gearing within the gear box 24, as shown in detail in Figs. 7, 8, 9 and 10, comprises the horizontally extending shaft 23 which extends through the bearing 107 in the end wall 108 of the box 24, said shaft being in alinement with and secured to the motor shaft 22 by the coupling 65, and the extending end of said shaft 23 within the box 24 being supported in the sleeve portion 109 of the shaft 60, which extends through the end wall 110 of the box and is supported in the bearing 111 in said end wall, the shaft 60 having the sprocket 59 thereon.

Securely fixed to the shaft 23 is a take-off member 112 and for clutching cooperation with one side of said take-off member is a clutch 113 which is securely fixed to the extending end of the sleeve portion 109 of the shaft 60, and in abutment with the clutch 113 is a grooved shift collar 114 which is also securely fixed to the sleeve portion 109, and mounted in the groove of said collar is a shifting member 115 having cooperable connection with the extending ends 116 of a swingably mounted bifurcated member 117 having its ends pivotally connected to the opposite sides of the gearing box 24, as shown more clearly in Figs. 7 and 10. Securely fixed to the bifurcated member 117, is a lever 118 and for cooperation with the extending end of said lever is an eccentric cam 119 which is fixed to one end of a short shaft 120 which is supported in the side wall 121 of the box 24, and connected to said shaft is a universal joint 122 which is controlled by an operating rod 123 which extends upwardly to a point accessible to the operator, adjacent the extending ends of the handle bars 17.

A gear 124 is slidably keyed to the shaft 60 within the box 24, and in mesh with said gear and the gear 88 is a gear 125 which is loosely mounted on a stub shaft 126 secured in the end wall 110 of the box 24, said gears 124, 125 and 88 being reduction gearing for operating the cutting reel 76 of the device C through the chain belt 85 and operating sprockets 84 and 86, when power is transmitted from the take-off member 112 through the clutch 113 and sleeve portion 109 of the shaft 60. A coil spring 127 is mounted on the sleeve portion 109 between the grooved collar 114 and the gear 124 for normally holding the clutch 113 in clutching relation with the take-off member 112. For releasing the clutch 113 from the take-off member 112, the rod 123 upon manipulation by the operator will turn the shaft 120, and the eccentric cam 119 will be turned to push the lever 118 downwardly for rocking the bifurcated member 117 and causing the shifting member 115 to move the collar 114 and the sleeve portion 109 on which it is mounted, against the pressure of the spring 127. Obviously, the clutch 113 carried by this sleeve portion 109 will thus be disengaged from the take-off member 112, but the gear 124 on the sleeve portion 109 will not be shifted by the sleeve portion because of it being longitudinally slidable on the key 124ª.

For clutching cooperation with the other side of the take-off member 112, is a clutch 128 which is keyed to a sleeve 129, said sleeve being mounted on the shaft 23 in opposite disposition to the sleeve portion 109 of the shaft 60, and keyed to said sleeve and in abutment with said clutch 128, is a gear 130 and securely fixed by keying to the opposite end of said sleeve, is a grooved collar 131 and a gear 132.

The sleeve 129 is longitudinally slidable on the shaft 23 and in end engagement with said sleeve is a coil spring 133 having seating engagement at its other end with a collar 134 fixed to the shaft 23, and for cooperation with the grooved collar 131 is a shifting mechanism 135 having identical parts referred to as 115 to 122 inclusive, which is operable by a turnable rod 136 which extends to a point adjacent the operator similarly as does the rod 123, and is adapted to be manipulated for releasing the clutch 128 from the take-off member 112 by shifting the sleeve 129 against the pressure of the spring 133, and to hold the clutch in its retracted position against the pressure of the spring 133 by reason of the cam action of the eccentric cam 119 on the lever 118.

For cooperation with the gear 132 is a gear 137 and for cooperation with the gear 130 is a gear 138, said gears being in abutment, and in abutment with the gear 138 is a pinion 139, said gears 137, 138 and 139 being fixed on a slidable shaft 140 which is mounted in bearings 141 and 142. In constant mesh with the pinion 139 is a gear 143 which is keyed to and is slidably mounted on the shaft 64 which is supported in bearings 144, and for holding the gear 143 in constant mesh with the pinion 139, an engaging plate 145 is secured to one of the faces of the pinion 139.

The shaft 140 on the end which is engaged in the bearing 142, has a pair of annular grooves 146 and 147, and for cooperation with said grooves is a spring-held locking ball 148, said grooves and cooperating locking ball, adapted to hold the shaft 140 in respective positions wherein the gear 137 will either be held in mesh with the gear 132 or the gear 138 in mesh with the gear 130, when the shaft 140 is shifted to the indicated positions by hand engagement with the knob 140ª on said shaft, and the gear 143 in mesh with the pinion 139 being longitudinally moved on the shaft 64 simultaneously with any shifting of the held-together gears 137, 138 and 139.

In the operation of the power transmission gearing on the coupled together devices A and B, as shown in Figs. 1 and 3, power from the motor shaft 22 will revolve the shaft 23 therewith, and if the devices A and B are being moved to the place of work, the clutch 128 is engaged with the take-off member 112 by the coil spring 133 bearing against the sleeve 129, the letting-in of the clutch by the coil spring 133 being permitted by manipulating the rod 136 of the shifting mechanism 135, to release the eccentric cam 119 from locking engagement with the lever 118 of the shifting mechanism. However, at the time of engagement of the clutch 128 with the take-off member 112, either the gear 137 or the gear 138 should first be moved into meshing engagement with respective gears 132 or 130.

If the gear 138 is in mesh with the gear 130, the power transmitted therethrough and to the gear 143 on the shaft 64, will be of slow speed order and consequently, the sprocket 63 on said shaft which cooperates with the sprocket 62 on the roller shaft 19 by the chain belt 61, will transport the coupled devices at slow speed to the place of work. If however, the gear 137 is in mesh with the gear 132, a higher speed will be transmitted to the shaft 64. Consequently, the traction rollers 18 will be given a faster ground engaging speed.

At the place of work, the cutter bars 41 carrying the knives 44 are put into working operation by manipulating the rod 123 to unlock the eccentric cam 119 from engagement with the respective lever 118 so that the coil spring 127 will cause the collar 114 to slide the sleeve portion 109 of the shaft 60 on the shaft 23, thereby engaging the clutch 113 into clutching relation with the take-off member 112.

The engaging of the clutch 113 with the take-off member 112 will impart the same speed to the shaft 60, as is obtained by the shaft 23, and as the sprocket 59 is mounted on the extending end of the shaft 60, the same speed of shaft 60 will be transmitted to the shaft 53 with which the vertical cutter bar shafts 38 are cooperably connected by the chain belt 58 and cooperable sprocket 55 on the shaft 53.

When the device A is disconnected and the device C is coupled forwardly of the device B by the pusher arm 75, it is obvious that the chain belt 58 will be removed from the sprocket 59 on the transmission shaft 60, power to the cutting reel 76 of the device C being transmitted thereto by connecting the chain belt 85 over the sprocket 86 on the shaft 87, which is extended from the transmission gearing and the sprocket 84 on the shaft 77 of the cutting reel. As the sprocket 86 and shaft 87 thereof is operated by the reduction gearing 124—125 and 88, the speed of rotation of the cutting reel 76 is lower than that of the cutter bars 41 and knives 44 carried thereby, which is requisite in cutting devices of this character.

As may be required due to the nature, size or condition of the verdant growth to be cut, either the device A having the horizontally disposed cutting knives 44, or the device C having the cutting reel 76, may be traveled at either high or low speeds by slidably manipulating the shaft 140 to dispose the gears 137—138 into meshing engagement with their respective gears 132—130.

The knives 44 of the device A on the cutter bars 41 are disposed in the same horizontal plane and the rotating arcs D in Fig. 3, described by the knives or respective cutter bars, are shown to overlap one another, this overlapping arrangement eliminating the possibility of any uncut ridges being formed or left within the cut-over area encompassed by the rotating knives, leaving evenly cut greensward as a result, this overlapping or cutting arcs in the same plane, being afforded by a synchronized seating of the cutter bars relative to each other.

From an inspection of Fig. 3, it is to be noted that the cutter bars 41 and their knives 44 are rotated in the same direction, and in so doing, the cut weeds of all of the knives will be thrown into a windrow on the right-hand side of the device A when the device is being traveled in the direction indicated by the arrow E, and so that the end edges 149 of the knives 44 may not strike the severed fallings weeds or the like, said end edges may be cut back on an angular line approximately as shown in dotted lines.

Having thus described the invention so that those skilled in the art will be able to practice the same, what we desire to secure by Letters Patent is defined in what is claimed, it being understood that various changes in the devices shown and described in detail and not amounting to invention, may be made without departing from the spirit and scope of our invention.

What we claim is:

1. A mowing device having a vertically inclining shaft, a depending bracket for the support of said shaft, cutting knives extending at right angles from the lower end of said shaft beneath said bracket, and a relatively long upwardly extending hub carried by said shaft and encasing the lower end of said bracket.

2. A mowing device having a vertically inclining shaft, a depending bracket for the support of said shaft, a knife supporting bar fixed to the lower end of said shaft at right angles thereto, a knife supported by said bar, and a hub secured to said bar and surrounding said bracket for a considerable distance of its length.

3. A horizontally rotatable cutter for a mowing device comprising a vertically disposed shaft, a supporting bar fixed at right angles to the lower end of said shaft, and a cutting blade secured to one end of said bar by a pair of pins each of which are disposed at different radii from the shaft, the outer disposed pin of said pair of pins being of lesser diameter than the other pin.

4. A horizontally rotatable cutter for a mowing device comprising a vertically disposed shaft, a supporting bar concentrically fixed at right angles to the lower end of said shaft, a knife carried by said bar at one end thereof and in alinement therewith, and a pair of pins for securing said knife to said bar and disposed at different distances from said shaft, the outer disposed pin being of weaker metal than the other pin.

5. A power moving device comprising, a base member having a rearwardly disposed traction roller, a frame disposed forwardly of said base member and having side arms detachably secured to said base member, casters for the support of said frame, a vertically disposed guiding member secured to each side arm, a transversely disposed beam having depending ends adjustably secured in respective guiding members, a series of horizontally rotatable cutters supported from said beam, a motor mounted on said base member, and means to drive said roller and said cutters from said motor.

6. A mowing device having a vertically inclined shaft, a depending bracket for the support of said shaft, a knife supporting bar fixed to the lower end of said shaft at right angles thereto, a knife carried by said bar, and a relatively long flanged hub secured to said bar by the flange of the hub, said hub encasing said bracket a considerable distance of its length and from the lower end thereof.

JOSEPH C. STEINER.
CLAUDE C. FULTON.